Dec. 20, 1966   L. C. JONES, JR., ET AL   3,293,003
CONTROLLING WATER AND CARBON BLACK, FEED RESPONSIVE
TO WEIGHT OF FEED TO PELLETIZER
Filed June 3, 1963   2 Sheets-Sheet 1

INVENTOR.
L. C. JONES JR., D. W. STAFFORD, J. W. EDMINSTER
BY

Dec. 20, 1966 L. C. JONES, JR., ET AL 3,293,003
CONTROLLING WATER AND CARBON BLACK, FEED RESPONSIVE
TO WEIGHT OF FEED TO PELLETIZER
Filed June 3, 1963 2 Sheets-Sheet 2

*INVENTOR.*
L. C. JONES JR., D. W. STAFFORD, J. W. EDMINSTER
BY

United States Patent Office

3,293,003
Patented Dec. 20, 1966

3,293,003
CONTROLLING WATER AND CARBON BLACK FEED RESPONSIVE TO WEIGHT OF FEED TO PELLETIZER
Louis C. Jones, Jr., Big Spring, and Dennis W. Stafford and James W. Edminster, Pampa, Tex., assignors to Cabot Corporation, Boston, Mass., a corporation of Delaware
Filed June 3, 1963, Ser. No. 285,445
11 Claims. (Cl. 23—314)

This invention relates to an improved process for converting finely divided carbon blacks to a uniform, free-flowing, aggregate form in which form the black has improved strength and thus may be bulk handled more conveniently without suffering breakdown and also is still readily dispersible in polymeric materials. Included in the present invention is apparatus which is especially useful for effectuating our novel process.

It is well known that carbon blacks as manufactured are first produced in an extremely finely divided, e.g., fluffy, form and must be converted to a free-flowing pelletized form in order to be handled, stored and shipped inexpensively and conveniently. Many methods and devices for pelletizing carbon black are known to the art. For example, one method involves the agitation of the dry fluffy blacks in such a manner so as to reduce the quantity of air or other gases associated with the black and cause a degree of agglomeration of the discrete particles of the black. Such a dry pelletization technique is satisfactory when channel or other impingement type blacks are involved but is much less suitable for pelletizing furnace type blacks. Generally, pelletization processes for furnace type blacks involves the agitation of the fluffy black in the pelletizer with sufficient water and/or sometimes other liquids such as oils and the like to permit agglomeration of the black into pellets of suitable strength. However, despite the many methods and devices available to accomplish pelletization, especially wet pelletization, there is presently no method or device which is completely satisfactory in producing pellets of uniform strength and size.

One of the basic problems involved in producing on a commercial scale pellets of uniform strength and size by wet pelletization techniques is in bringing the ingredients together, e.g., the liquid and the black, in a suitable pelletizer or mixer in a uniform and predetermined ratio by weight. The particular ratio of water to black chosen as optimum for a given case will greatly be predetermined by consideration of many such factors as the type of black involved, the particular pelletizer involved, the degree of pellet strength desired, the application for which the pellets are intended, and other factors known to those skilled in the art. In accordance with our invention, we have found that the maintenance of a substantially constant water black ratio during pelletization is even more critical in obtaining pellets of uniform quality than has been heretofore imagined. In fact, we have found that even variations of about ±1.0% of the predetermined target water black weight ratio will affect the size, strength and quality of the pellets produced, resulting in the production of pellets of inferior or variable and in most cases substandard, quality. In present pelletization processes, however, any desired or predetermined water black ratio is almost impossible to maintain accurately or uniformly, especially within the critical limits required, because of the difficulty of conveying the unpelletized black to the pelletizer at a controlled or uniform mass rate and/or controlling the water or other liquid feed rate directly in uniform proportion to the actual black feed rate.

Generally, in present wet pelletization processes, any adjustments in flow rates of the critical ingredients to the pelletizer are made deliberately at intervals by an operator by means of manually operated controls based upon the operator's observations and judgment. Thus, the quality of pellet produced depends in large measure upon the skill and intuition of the operator, who, in most cases, has insufficient control over, or means of immediately detecting or compensating for, factors which are inherent in the equipment and materials involved which affect the production of uniform pellets. Accordingly, more often than not, the pellets produced by present techniques have wide variations in size and strength having segregated pockets of dust and variable degrees of strength which oftentimes creates serious bulk handling and/or dispersion problems.

The primary object of the present invention is to provide a process for producing carbon black pellets of uniform quality and strength which may be handled conveniently in bulk form.

Another object of the present invention is to provide a process for producing carbon black pellets of improved strength and quality.

Still another object of the present invention is to provide apparatus especially suitable for effectuating the objects of our processes.

Other objects and advantages of the present invention will in part be obvious to those skilled in the art or will in part appear hereinafter.

The above objects and advantages are realized in accordance with the practice of our invention by a novel integration of steps designed to determine continuously, in automatic fashion, the mass rate at which black is being conveyed to the pelletizer which determination is treated as a continuous integral which is transmitted or fed back to devices as an electronic or a pneumatic signal so as to control the relative rate at which the ingredients are fed to the pelletizing apparatus and thereby continually maintain a predetermined target water black weight ratio in the apparatus involved within very narrow critical tolerances e.g., within about ±1% of the predetermined water black ratio and preferably within about ±0.7% thereof. Another aspect of our invention involves a slight premoistening treatment of the black prior to the time the black enters the solids feeder which controls the rate at which said black is conveyed to the pelletizer. In accordance with this aspect of our invention, as will be illustrated hereinafter, we are able to produce pellets of surprisingly superior strength and quality at high production rates and/or with less binder materials being required to impart a given degree of strength to the ultimate pellets.

The process of our invention is best realized in accordance with a novel integration and arrangement of equipment some of which has novel design features especially adapted to achieve the objectives outlined above, together with means for continually determining in automatic fashion the mass rate at which one of the ingredients involved is being conveyed to the pelletizer and, in turn, for actuating control devices arranged to regulate continuously the relative feed rate to the pelletizer of the several ingredients involved.

In accordance with our invention we are able to produce carbon black pellets of substantially smooth uniform spherical shape and size and strength in a surprisingly consistent fashion. Accordingly, the pellets produced in accordance with our invention suffer reduced attrition and breakdown during handling which permits faster loading and unloading thereof from vehicles used to transports the black to its ultimate destination. Quite surprisingly, pellets produced in accordance with our invention not only show more strength in bulk handling but also are less difficult to disperse in a given polymeric material than pellets made by conventional technique.

Our invention will be better understood by reference to the attached drawings in which FIGURE 1 is a partly cross-sectional schematic view in elevation of an arrangement of apparatus especially useful in producing carbon black pellets of superior strength and uniform size.

Figure 1:
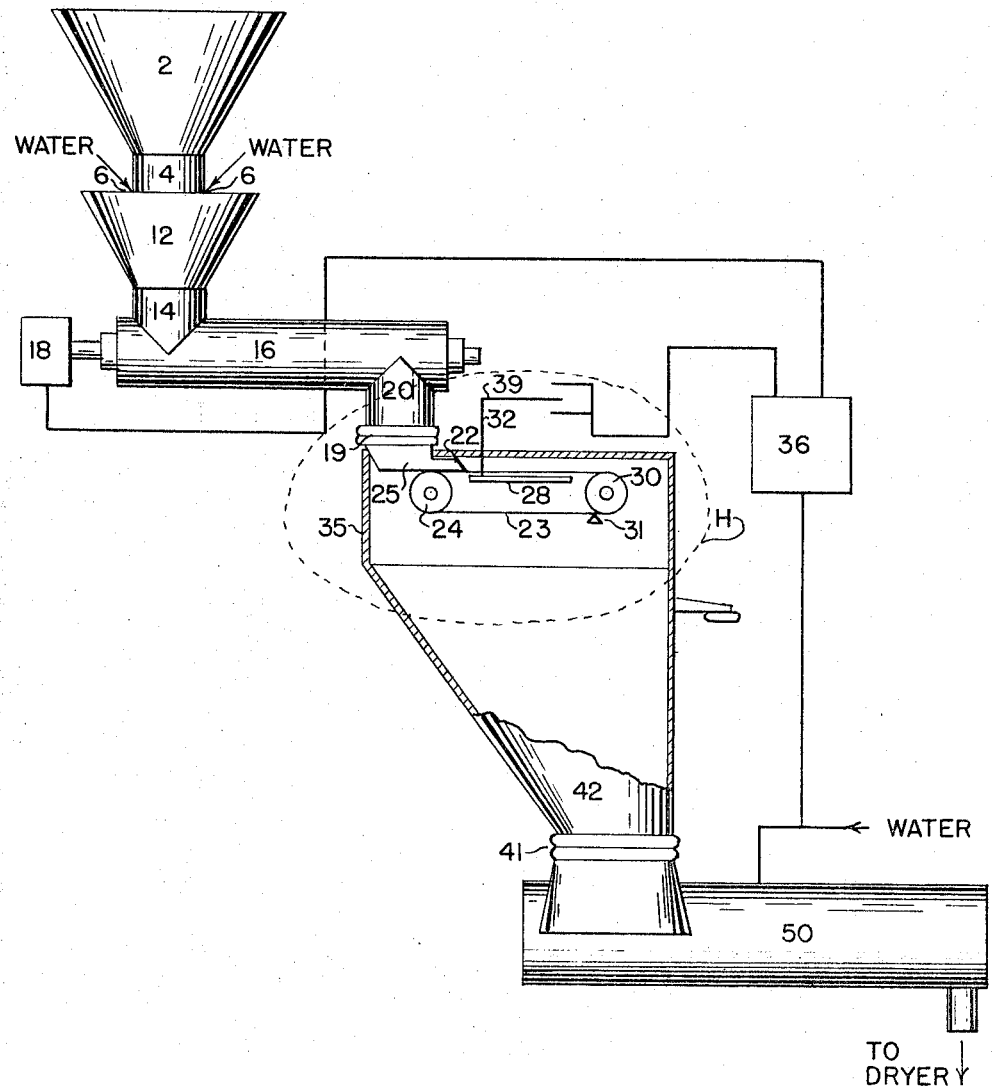

Referring now to FIGURE 1, the fluffy black is collected generally as produced, in cyclone collectors 2 or like devices useful for collecting the finely divided black after the production thereof. The black is then conveyed to agitator tank 12 through micropulverizer 4. It is to be understood that any number of micropulverizers may be utilized depending upon the production rate involved. Directly beneath the pulverizer 4 is a receptacle such as agitator tank 12. The agitator tank 12 should densify the fluffy black slightly and provide a continuous feed of same from the tank without any bridging or hanging up of the black in the tank, for example through conduit 14 usually to a volumetric solids feeder 16 driven by motor 18. Preferably, solids feeder 16 is a screw conveyor or other like feeding devices which are generally considered to be capable of transporting materials at a controllable volumetric rate. However, when carbon black or other fluffy material is involved, serious variations in the mass feed rate occur and will normally occur. These variations are caused by several factors, the most significant of which are fluctuations in black densities, fluctuations in feed tank pressure and level and the tendency of the carbon black, etc., to cake to at least some extent in the screw conveyor. We have found, for example, that the mass feed rate will vary up to about 15% to 20% with the feed screw r.p.m. held constant.

In the preferred embodiment of our invention, a plurality of nozzles 6 uniformly distributes a fine spray of water on the black as same is delivered to agitator tank 12. It is to be understood that these nozzles could be located prior to the pulverizer but we have found that they are best located in agitator tank 12, preferably in the upper regions thereof. The nozzles 6 should be water atomizing nozzles in order to provide a very fine spray of water which the black encounters as it leaves the pulverizer and/or enters the tank. We have found that the addition of a minor amount of water uniformly to the black at this stage is an especially preferred feature of our invention and greatly enhances the properties and especially the strength of the ultimate pellets despite the fact that the minor amount of water added generally only represents from about 0.5% by weight of the total weight of the black and water to no more than about 3% by weight of the black and water, with amounts between about 1.0 to about 2.5% by weight of the black and water being especially preferred.

Figure 3:
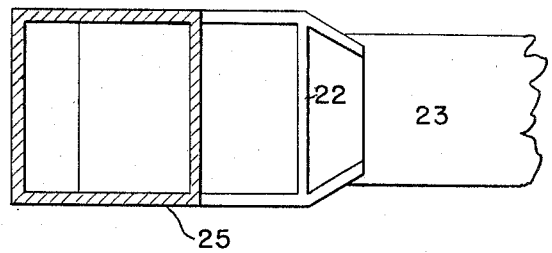
FIGURE 3 is a top view of a portion of the apparatus of FIGURE 1 taken from line F—F and illustrates in detail, desirable features of a portion of the apparatus used to control the delivery of the main solid ingredient involved.

In our process, the screw conveyor does not feed the black directly to the pelletizer but rather as shown, the black is delivered from feeder 16 to a continuous weight sensing device 35 via conduit 20. It will be noted that conduit 20 is attached to the weight sensing device, e.g., a weigh belt 35, preferably by means of a flexible connection 19. Since the weigh belt and the recording instruments utilized therewith are very sensitive, it is desirable to isolate these from any vibrations which would interference with the proper operation thereof. Weigh belt 35 comprises an endless belt 23 running on end rollers 24 and 30 respectively. The belt 23 should be substantially the same width as the chamber enclosing same so that all of the black delivered to the pelletizer will be recorded. Also, in order to prevent excessive spillage of the black from the belt, guide chute 25 should be mounted over the portion of the belt above end roller 24, as illustrated in FIGURE 3, in order to contain the black as it is delivered thereto from conduit 20 and to direct the black to the central portions of the belt to minimize spillage from the sides thereof. Knife edges 22 can be provided at the forward end of said chute 25 in order to prevent excess spillage of the black from the chute to the belt. The black on the belt then passes over weighing platform 28. The weight of the material passing thereover is continually transmitted through a yoke 32 to a beam arm 39. Variations in the weight of the black travelling over platform 28 cause movement of the beam arm 39 above or below the horizontal position and this deviation from the horizontal position produces a signal which is transmitted to proportional controller 36.

Proportional controller 36 is mounted on a panel (not shown) which is also isolated in known fashion from the effects of any vibration from the pelletizer or other equipment involved. The controller is designed and regulated so that upon response to a given signal, either electronic or pneumatic, transmitted from beam arm 39, the weight of water being fed to pelletizer 50 may be adjusted so as to compensate for any determined variation in the weight of black delivered thereto. In the especially preferred embodiment of our invention, controller 36 serves also to simultaneously regulate the speed of motor 18 which drives screw conveyor 16 in such a way as to more nearly maintain a constant black mass feed rate to the pelletizer. By controlling both the water and black, we are able to obtain superior pellets, by reducing the magnitude of the cycling of the controller 36, and also avoid other problems such as variations in dryer load and dryer temperatures. These improvements are obtained in accordance with this aspect of our invention whether the premoistening step is involved or not but the premoistening step is recommended especially when "fluffier" blacks are involved. It is to be understood, however, that when the premoistening step is involved a certain degree of improvement is obtained by determining the amount of black fed to the pelletizer and transmitting the signal obtained to a ratio controller which controls the flow of water only to the pelletizer.

Thus, in accordance with our system, the weigh belt 35, or other such equivalent continuous weight measuring device, is able to detect and make immediate corrections of controllable variations in black feed rate. These flow rate variations, whether small or great and regardless of the frequency of their occurrence, are automatically detected and immediately compensated for by adjusting the speed of the conveyor screw and/or adjusting the water delivered to the pelletizer to maintain the required predetermined water black weight ratio therein within about ±1% thereof. Other continuous weight measuring or weight detecting devices suitable for our process include those described under the title of "Bulk Weigher" on page 67 of the December 15, 1962 edition of Chemical Week.

Upon passing over weighing platform 28, the black falls from the belt through hopper 42. It is important that hopper 42 be designed so as to provide a bottomless effect under the weigh belt to insure a fast and complete delivery of the black to the pelletizer. Otherwise the black may collect and interfere with the mechanical operation of the weigh belt instead of being delivered directly to pelletizer 50 which is connected to hopper 42 by means of a flexible coupling 41 which is required to prevent vibrations from the pelletizer being transmitted to the weigh belt. Also, scraping device 31 should be positioned near end roller 30 so as to communicate with the belt as it deposits the black into hopper 42. In this manner, any adhering black is removed from the belt so that such black will not accumulate to any appreciable extent and contribute to variations in weighing.

After the pelletizing operation is complete, the pellets are dried in a suitable apparatus such as a rotary type drum dryer.

We have found that superior pellets having greater bulk handling strength and yet excellent dispersion properties may be produced in accordance with the process and apparatus of our invention. We have also found that quite surprisingly when the black is premoistened slightly, we are able to produce pellets of superior strength even with the use of considerably less binder. The desirability of such an accomplishment will be obvious to those skilled in the art. Although it is known that binders will increase the strength of pellets, nevertheless it is also known that an amount of binder solids above about 1% by weight of the black will generally have a serious adverse effect on the rubber properties of vulcanizates which contain the pelletized black.

It is to be understood with regards to this aspect of our invention that although the premoistening step is a preferred embodiment of our invention when the signal obtained from the weight determining device regulates both the speed of the volumetric solids feeder and the rate of introduced liquid to the pelletizer, the premoistening step is essential when the signal only serves to regulate the device which adjusts the rate of introducing the liquid to the pelletizer. When the denser blacks especially are involved, improved pellets may be produced with a high degree of uniformity merely by utilizing the signal to control the rate of introducing the liquid to the pelletizer. However, a greater and more desirable degree of improvement is realized when the signal controls the rate of introduction of both ingredients with the maximum degree of improvement being realized in most cases when the premoistening step is utilized.

The following examples are offered so that those well skilled in the art may better understand how best to practice our invention. It is to be understood that the foregoing examples are ilustrative in nature and in no way are they to be considered as limiting our invention beyond those limits expressly set forth in the present specification or in the claims which appear hereinafter.

*Example 1*

Figure 2:
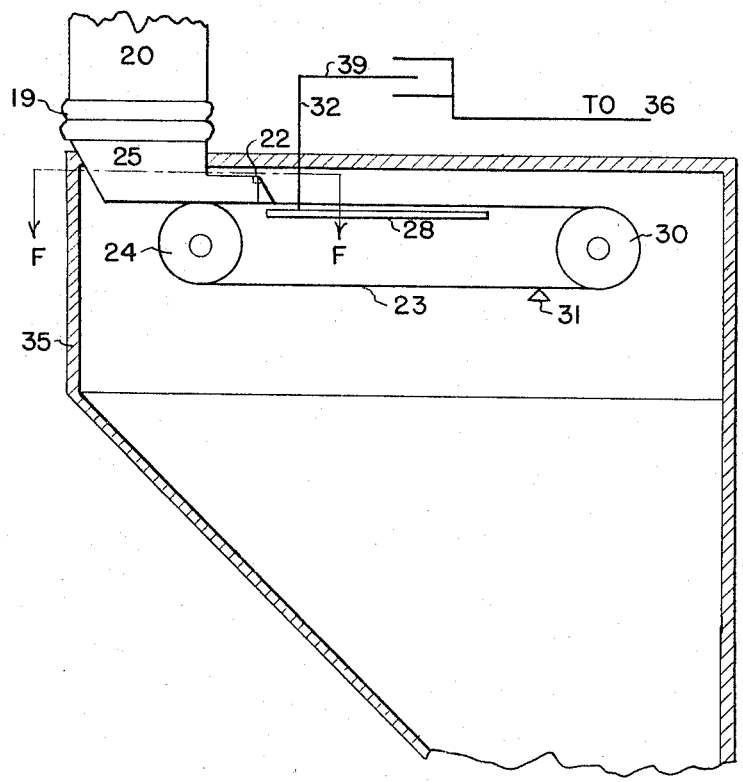
FIGURE 2 is an enlarged, partly cross-sectional view in elevation of the apparatus of FIGURE 1 encircled by circle H.

In order to demonstrate the superiority of pellets produced in accordance with our invention, the following data were obtained from parallel operation in order to compare the pellets produced in conventional pelletization apparatus (pellets SV1) according to conventional techniques, and those prepared in accordance with our process in apparatus similar to that set forth in FIGURE 1 (pellets SV4C). The procedure and apparatus used in preparing pellets SV4C were substantially the same as that described in the discussion of FIGURES 1, 2 and 3, but no water was sprayed on or otherwise contacted with the black until the blacks were introduced to their respective pin type pelletizers. Pellets SV1 were made essentially in accordance with the following technique. The black was fed from a cyclone collector or a reservoir through a micro-pelletizer directly to an agitator tank. The black was delivered directly to a manually controlled screw type conveyor and from there charged to a pin type pelletizer and then the resulting pellets were dried in a rotary drum drier. The production rate from each unit was 37,500 lbs. per day. For the particular black being pelletized and the pelletizers involved, the optimum water/black ratio was determined to be 73.9 parts water per hundred parts of black. Also, in each unit, the water delivered to the pelletizer contained 3% by volume of a molasses solution having a specific gravity of 1.160. The solids in this molasses solution functions as a binder material to provide additional strength to the pellets. Accordingly, the amount of liquid present in the pelletizers was intended to be maintained at about 42.5% of the total weight of water and black. However, this ratio could not be consistently maintained in the pelletizer producing pellets SV1 and the amount of water therein varied at times from about 40% by weight to about 45% by weight or somewhat higher during the six days involved. The following data were obtained.

TABLE I

| | SV1 | SV4C |
|---|---|---|
| Average Western Electric Standard Deviation (Western Electric), lbs | 53±13.5 | 66±4 |
| Range of Western Electric (95% Confidence Limit), lbs | 26-80 | 58-74 |
| Average 20′ Rotap Dust Standard Deviation (20′ Rotap), percent | 3.3±2.8 | 1.1±0.4 |
| Range 20′ Rotap (95% Confidence Limit), percent | 0-8.8 | 0.49-1.8 |

It will be obvious from the above data that pellets SV4C are not only of a more uniform quality but also are superior in strength to pellets SV1. Accordingly, for a given concentration of binder material, we are able to provide pellets having superior crush strength, e.g. higher Western Electrics. Also, it will be obvious to those skilled in the art that the reduced Rotap values of pellets SV4C indicate that the pellets contain less dust and are more uniform in quality than pellets SV1.

*Example 2*

The following studies were made in order to illustrate the advantages derived from the especially preferred embodiment of our invention, i.e., the addition of a minor amount of water to the black prior to the time the black is conveyed to the pelletizer in the controlled fashion we have found to be especially advantageous. The runs comprising the studies below were all conducted on the same apparatus used to produce pellets SV4C of Example 1 but in some of the runs, nozzles were provided to premoisten the black. In the following studies, the amount of $H_2O$ sprayed on the black is expressed as percent water based on the total weight of black and water.

In those runs below involving premoistening of the black, the nozzles used to distribute the water had openings of about 1/32″ in order to provide a very fine spray. Two nozzles were used and these were placed opposite each other and were located at the upper portion of the agitator tank. The flow to each nozzle varied between 2.8 g.p.h. to 4.5 g.p.h. depending upon the amount of water being added to the black. The predetermined water/black ratio in the pelletizer was 0.695. It is to be understood that the target water/black ratio will vary somewhat in accordance with the black involved and the pelletizer utilized and will be adjusted slightly to take into consideration the amount of water added in the premoistening step. The following data were obtained.

TABLE II

| | Run No. | Prod. Rate, lbs./day | Percent Binder | Percent H₂O Added by Weight of Black | Western Electric | 20' Rotap |
|---|---|---|---|---|---|---|
| Study I | 1 (Std.) | 75,000 | 1½ | 0 | 42 | 4.0 |
| | 2 | 75,000 | 1½ | 1½ | 52 | 2.9 |
| Study II—(Production Rates) (No Premoistening) | 1 (Std.) | 75,000 | 1½ | 0 | 42 | 4.0 |
| | 3 | 64,000 | 1½ | 0 | 49 | 3.4 |
| | 4 | 53,000 | 1½ | 0 | 56 | 3.0 |
| Study III | 1 (Std.) | 75,000 | 1½ | 0 | 42 | 4.0 |
| | 5 | 75,000 | 1½ | 1½ | 47 | 3.5 |
| | 6 | 75,000 | 1½ | 2.2 | 60 | 3.1 |
| Study IV | 7 | 75,000 | ¾ | 1½ | 40 | 5.3 |
| | 8 | 75,000 | 1 | 1½ | 46 | 4.4 |
| | 2 | 75,000 | 1½ | 1½ | 52 | 2.9 |
| | 10 | 75,000 | 2.0 | 1½ | 63 | 3.2 |
| Study V—(Production Rates) (With Premoistening) | 10 | 75,000 | 2.0 | 1½ | 62 | 2.5 |
| | 11 | 56,000 | 2.0 | 1½ | 62 | 2.5 |

The above data illustrates some of the surprising advantages which may be obtained in accordance with the practice of the preferred embodiment of our invention. For example, note that when the amount of water added amounts to only 1½% by weight of the black and water, the strength and quality of the resulting pellets is greatly improved over those pellets produced in Run #1. Also, note, that the pellets produced in Run #2 are almost comparable in both strength and quality to those produced in Run #4. Thus, in accordance with our invention we are able to produce high quality pellets at high production rates merely by adding about 1½% water based on the weight of black and water prior to the controlled delivery of the black to the pelletizer. The data illustrate that many advantages, especially in uniformity, may be obtained merely by delivering the black and water to the pelletizer in a manner so as to control and insure the maintenance of a water/black ratio within very critical tolerances, and that even greater advantages are derived from the practice of the preferred manner of our invention.

Many variations of the apparatus and incidental techniques utilized to illustrate our invention will be obvious to those well skilled in the art and these may be substituted for those offered for purposes of illustration without departing from the spirit and scope of our invention.

Having described our invention together with a preferred embodiment thereof what we declare as new and desire to secure by U.S. Letter Patent is as follows:

1. A process for wet pelletizing carbon blacks wherein the ingredients comprising carbon black and a liquid are agitated in a pelletizer after being separately introduced thereto comprising the steps of:
   (a) conveying finely divided carbon black at approximately the rate desired by means of a largely volumetrically controlled solids feeder to a continuous weight determining zone prior to introducing said black to said pelletizer,
   (b) continuously determining the weight of the carbon black delivered to said zone,
   (c) continuously translating the weight of the black determined to a signal, and
   (d) continuously transmitting the said signal to a control device which responds to said signal to adjust the rate at which the black is conveyed to the weight determining zone and the rate at which the water is introduced to said pelletizer to counteract changes in the ratio of black and liquid fed to said pelletizer from a predetermined ratio.

2. The process of claim 1 wherein the said black conveyed in step (a) already contains from about 0.5 to about 3% by weight of moisture.

3. A process for pelletizing carbon blacks wherein the ingredients comprising carbon black and a liquid are agitated in a pelletizer after being separately introduced thereto comprising the steps:
   (a) continuously introducing a quantity of finely divided carbon black containing from about 0.5 to about 3% by weight of moisture to a volumetrically calibrated conveyance device,
   (b) conveying said black in substantially constant volumetric fashion to a continuous weight determining device leading to said pelletizer to determine continuously the weight of said black being delivered to said pelletizer,
   (c) continuously translating the weight of black determined by said device to a signal, and
   (d) continuously transmitting the signal to a control device which responds to said signal to adjust the rate at which the liquid is conveyed to said pelletizer to counteract changes in the ratio of black and water fed to said pelletizer before fluctuations in said ratio as large as about ±1% can occur.

4. The process of claim 3 wherein said control device responds to said signal by also adjusting the rate at which said black is conveyed to said weight determining device.

5. The process of claim 3 wherein the said black introduced to said conveyance device contains from about 1 to about 2.5% by weight of moisture.

6. Apparatus for pelletizing carbon black wherein the ingredients comprising carbon black and a liquid are agitated in a suitable pelletizer after being introduced thereto by separate means comprising in combination and suitably connected in the order named, means to convey finely divided black in substantially continuous fashion and in an approximately known amount, means to continually determine the weight of said conveyed black prior to introducing said black to said pelletizer, means to translate the weight rate thus determined to a signal, means to transmit said signal to control the means to regulate said black conveyance means and the means to introduce a liquid to said pelletizer.

7. The apparatus of claim 6 including means to add from about 0.5 to about 3% by weight of the black of moisture to said black prior to the time said black is introduced to said means to convey said black to said pelletizer.

8. Apparatus for pelletizing carbon black wherein the ingredients comprising carbon black and liquid are agitated in a suitable pelletizer after being separately introduced thereto by separate means comprising in combination means to add from about 0.5 to about 3% by weight of moisture to said black, means to agitate said moistened black, means to convey said black in a substantially constant volumetric fashion, means to continually determine the weight of said black prior to introducing said black to the pelletizer, flexible means to connect said conveyance means to said weight determining means, means to translate the weight determined by said weight determining device to a signal, means to transmit said signal to a control device regulated so that in response to said signal said control device adjusts said means to introduce the liquid to said pelletizer to maintain a predetermined black-liquid ratio in said pelletizer and means for drying the pellets produced in said pelletizer.

9. The apparatus of claim 8 wherein said control device also adjusts the speed of said black conveyance means.

10. The apparatus of claim 9 further characterized by a bottom-less hopper located beneath said continuous weight determining device and with the opposite end thereof flexibly connected to said pelletizer.

11. The apparatus of claim 9 including means to isolate said control means from vibrating effects emanating from said pelletizer.

References Cited by the Examiner

UNITED STATES PATENTS

| | | | |
|---|---|---|---|
| 2,206,237 | 7/1940 | Roberts | 137—98 X |
| 2,626,728 | 1/1953 | Harper | 137—99.5 X |
| 2,800,399 | 1/1957 | King | 23—313 X |
| 2,888,026 | 5/1959 | Henderson | 137—88 |
| 2,889,030 | 6/1959 | Mottet | 177—60 X |
| 3,056,162 | 10/1962 | Fisher | 23—314 X |

FOREIGN PATENTS 845,041  8/1960  Great Britain.

NORMAN YUDKOFF, *Primary Examiner.*

S. J. EMERY, *Assistant Examiner.*